(12) United States Patent
Speede

(10) Patent No.: US 9,760,590 B2
(45) Date of Patent: Sep. 12, 2017

(54) MOBILE SENDER CONTROLLED DATA ACCESS AND DATA DELETION METHOD AND SYSTEM

(71) Applicant: Claremont Speede, Brandywine, MD (US)

(72) Inventor: Claremont Speede, Brandywine, MD (US)

(73) Assignee: Claremont Speede, Brandywine, MD (US)

( * ) Notice: Subject to any disclaimer, the term of this patent is extended or adjusted under 35 U.S.C. 154(b) by 0 days.

(21) Appl. No.: 13/998,024

(22) Filed: Sep. 24, 2013

(65) Prior Publication Data
US 2015/0089611 A1    Mar. 26, 2015

(51) Int. Cl.
| | | |
|---|---|---|
| G06F 17/30 | (2006.01) | |
| H04L 12/58 | (2006.01) | |
| G06F 21/62 | (2013.01) | |
| H04L 29/08 | (2006.01) | |
| H04W 12/08 | (2009.01) | |
| H04L 29/06 | (2006.01) | |
| H04W 12/06 | (2009.01) | |

(52) U.S. Cl.
CPC ........ *G06F 17/30368* (2013.01); *G06F 21/62* (2013.01); *G06F 21/6245* (2013.01); *H04L 51/08* (2013.01); *H04L 63/10* (2013.01); *H04L 67/02* (2013.01); *H04W 12/08* (2013.01); *H04L 63/08* (2013.01); *H04W 12/06* (2013.01)

(58) Field of Classification Search
CPC ... G06F 21/62; G06F 17/30368; H04L 51/08; H04L 63/10
USPC ............ 726/7, 1; 455/466; 709/229; 705/17; 713/182
See application file for complete search history.

(56) References Cited

U.S. PATENT DOCUMENTS

| | | | |
|---|---|---|---|
| 7,191,219 B2 | 3/2007 | Udell | |
| 7,797,390 B2 | 9/2010 | Hagale et al. | |
| 7,894,580 B2 | 2/2011 | Veen et al. | |
| 8,200,819 B2* | 6/2012 | Chung | H04L 63/0414 709/204 |
| 8,457,668 B2* | 6/2013 | Speede | H04W 4/14 455/466 |
| 2003/0028889 A1* | 2/2003 | McCoskey | H04N 7/17318 725/91 |
| 2003/0163457 A1* | 8/2003 | Yano | G06F 3/0613 |
| 2004/0003110 A1* | 1/2004 | Ozguner | H04L 69/22 709/236 |
| 2004/0145520 A1* | 7/2004 | Richardson | G01S 5/0027 342/357.4 |
| 2005/0124360 A1 | 6/2005 | Choi | |
| 2005/0128084 A1* | 6/2005 | Hoshina | G08B 13/2448 340/572.1 |
| 2006/0012393 A1* | 1/2006 | Raju Datla | H04L 41/16 326/39 |

(Continued)

OTHER PUBLICATIONS

IBM, SMS (Short message system) Remote Notification Method, PriorArtDatabase, IPCOM000145824D, Jan. 29, 2007, Country: Undisclosed.

*Primary Examiner* — Abu Sholeman

(57) ABSTRACT

A method and system are provided for remotely deleting data stored on the remote mobile communication device, and within the communication network, by initiating a delete command, or setting data time of existence when creating the data, from a sender mobile communication device.

8 Claims, 10 Drawing Sheets

(56) References Cited

U.S. PATENT DOCUMENTS

| | | | |
|---|---|---|---|
| 2006/0013217 A1* | 1/2006 | Datla | H04L 41/0213 370/389 |
| 2006/0031338 A1* | 2/2006 | Kang | G06Q 20/3674 709/206 |
| 2006/0041691 A1* | 2/2006 | Bashford | G06F 13/102 710/8 |
| 2006/0119678 A1* | 6/2006 | Arakawa | B41J 2/04541 347/90 |
| 2006/0122901 A1* | 6/2006 | Kawabata | G06K 7/0008 705/28 |
| 2006/0148496 A1 | 7/2006 | Zhu | |
| 2007/0106892 A1* | 5/2007 | Engberg | G06Q 20/02 713/168 |
| 2007/0143430 A1* | 6/2007 | Johnson | G06F 9/544 709/206 |
| 2008/0071800 A1* | 3/2008 | Neogi | G06F 9/542 |
| 2008/0098230 A1* | 4/2008 | Kalibjian | G06F 21/57 713/176 |
| 2008/0178300 A1* | 7/2008 | Brown | G06F 21/6218 726/29 |
| 2008/0244051 A1* | 10/2008 | Morris | G06F 17/30867 709/223 |
| 2009/0020602 A1* | 1/2009 | Pratone | H04W 88/02 235/380 |
| 2009/0042588 A1 | 2/2009 | Lottin et al. | |
| 2010/0030821 A1* | 2/2010 | Brown | G06F 17/30 707/E17.007 |
| 2010/0192006 A1* | 7/2010 | Gharat | G06F 11/3688 714/5.1 |
| 2011/0145186 A1* | 6/2011 | Hempelmann | G06F 17/30551 707/609 |
| 2011/0209203 A1* | 8/2011 | Shafer | G06F 21/604 726/4 |
| 2011/0270661 A1* | 11/2011 | Heiser, II | G06F 17/30867 705/14.25 |
| 2011/0289052 A1* | 11/2011 | Rambacher | G06F 17/30575 707/624 |
| 2011/0307450 A1* | 12/2011 | Hahn | G06F 17/30339 707/649 |
| 2012/0079017 A1* | 3/2012 | Ingrassia, Jr. | G06F 17/30029 709/204 |
| 2012/0159077 A1* | 6/2012 | Steely, Jr. | G06F 12/0804 711/130 |
| 2012/0184248 A1* | 7/2012 | Speede | 455/411 |
| 2012/0323854 A1* | 12/2012 | Schreter | G06F 17/30575 707/650 |
| 2013/0054925 A1* | 2/2013 | Hsia | G06F 11/3604 711/170 |
| 2013/0136031 A1* | 5/2013 | Schmidek | H04L 12/4654 370/254 |
| 2013/0161381 A1* | 6/2013 | Roundtree | G06Q 30/0207 235/375 |
| 2013/0167201 A1* | 6/2013 | Patel | H04L 67/1097 726/4 |
| 2013/0311549 A1* | 11/2013 | Abdulkadev | G06F 17/30867 709/203 |
| 2014/0052527 A1* | 2/2014 | Roundtree | G06Q 30/0245 705/14.44 |
| 2014/0089143 A1* | 3/2014 | Dione | G06Q 30/02 705/26.61 |
| 2014/0219100 A1* | 8/2014 | Pandey | H04W 28/08 370/236 |
| 2014/0278992 A1* | 9/2014 | Roundtree | G06Q 30/0257 705/14.55 |
| 2014/0331243 A1* | 11/2014 | Villoria | H04N 21/44204 725/14 |
| 2014/0344392 A1* | 11/2014 | Ozawa | H04N 21/6131 709/213 |
| 2014/0351364 A1* | 11/2014 | Rosenberg | H04B 5/0031 709/213 |
| 2015/0046557 A1* | 2/2015 | Rosenberg | H04W 12/08 709/213 |
| 2015/0207766 A1* | 7/2015 | Lindner | H04L 51/06 709/206 |
| 2016/0019893 A1* | 1/2016 | Funase | G10L 15/22 704/235 |
| 2017/0053317 A1* | 2/2017 | Dione | G06Q 30/02 |

* cited by examiner

MOBILE SENDER CONTROLLED DATA ACCESS AND DATA DELETION METHOD AND SYSTEM

CROSS-REFERENCES TO RELATED APPLICATIONS

This application is a non-provisional application of and claims the benefit of U.S. Provisional Application No. 61/744,332, filed on Sep. 24, 2012 by the present inventor.

BACKGROUND

Prior Art

The following is a tabulation of some prior art that presently appears relevant:

U.S. Patents

| Pat. No. | Kind Code | Issue Date | App or Patentee |
|---|---|---|---|
| 0,108,621 | A1 | May 19, 2005 | Kim et al. |
| 0,165,790 | A1 | Jul. 19, 2007 | Rakesh Taori |

Existing deletion systems allow for the sender of the data to have control over the storage and access of the data, within the communication network. However, once this data is accessed by the intended receiver, control and ownership of the data by the sender is lost. Knowledge of the data's existence cannot be determined by its sender. Prior art data deletion systems provide equal control over the access of the stored data, within the communication network, to the sender and the receiver. Existing systems do not make the mobile sender aware of the successful completion of the deletion of the sent data. The life cycle of the mobile sender's data is left to the strength, or weakness of a central system in use, enterprise policy, the receiving end user device, and or the action of data receiver. Existing deletion systems can solely delete short message services type data.

Accordingly, what is desired is a method for enabling data senders, such as a binary or ascii file senders, to have the capability to set, at their own convenience, the time of existence of their sent data, once the remote devices has received the data, or while the data still resides within the network.

Field of the Invention

The present invention generally relates to methods and a data delivery storage system, and more particularly, to methods and a data delivery storage system for remotely deleting binary or ascii formatted data stored on the remote mobile communication device, and within the communication network, by initiating a delete command, or setting a data time of existence during data construction, from a sender mobile communication device.

BACKGROUND OF INVENTION

Concerns about exposure of what was assumed to be confidential exchanges of information, has been the subject of debates aired over the media. It has become obvious that information, once transmitted, may be viewed by third parties along the data communication pathway and by others, the data receiver may choose to disclose it to. Many forms of data and communication encryption strategies address the communication pathway disclosure issue, but the end user receiver disclosure still exists. In the mobile space, this problem is magnified several times, due to the obvious transient nature of end users. For example, the sender of data has no control or knowledge of the data's existence, after it has been sent. The time of existence of the mobile sender's data is left to the data receiver, the strength, or weakness of system in use, and/or enterprise policy. This scenario adds to the problem of information leakage, which remains an issue even if the line of transmission is secure.

Elaborate security schemes are available to ensure confidentiality is ensured. However, the mobile recipient is not considered to be a member of the group of links, in the security chain, that may pose as a concern. For example, a sender transmits an encrypted data to a mobile receiver, who successfully utilizes it. This discrete data is unusable to everyone except the sender and recipient, thus maintaining confidentiality. However, if the receiver decides, on his own, to execute the data in the presence of a third party, the intended sender receiver confidentiality will be compromised. Also, if data is still in transit, residing on the network, before the receiver device even accesses it, the sender no longer has control over the data, thus leaving the data at the mercy of the rigor of enterprise policy.

Therefore, improvements for a mobile communication and a method for managing sent data, by the data sender, or owner, are needed in the industry to address the aforementioned deficiencies.

BRIEF SUMMARY OF THE INVENTION

Embodiments of the present invention provide techniques that enable a sender, using a mobile device, to control the access of sent data within a communication network, and to delete, at any time, sent data residing on the receiver's mobile device and network. When a sender attempts to transmit data to a receiver, the data residing within the communication network, that has not been accessed by the receiver, is considered owned by the sender. At this point, the sender may delete the data at will, as the receiver has yet to access the data. Once the data has reached receiver's device, the sender will be notified of the utilization of the remote data. With this notification, the sender may chose to delete the remotely located data. Alternatively, the sender may set a relative time and send data that will automatically get deleted, at the relative amount of time, after it is utilized, or at the relative amount of time after it arrives on the device.

A further understanding of the nature and advantages of the invention herein may be realized by reference of the remaining portions in the specifications and the attached drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION OF THE INVENTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
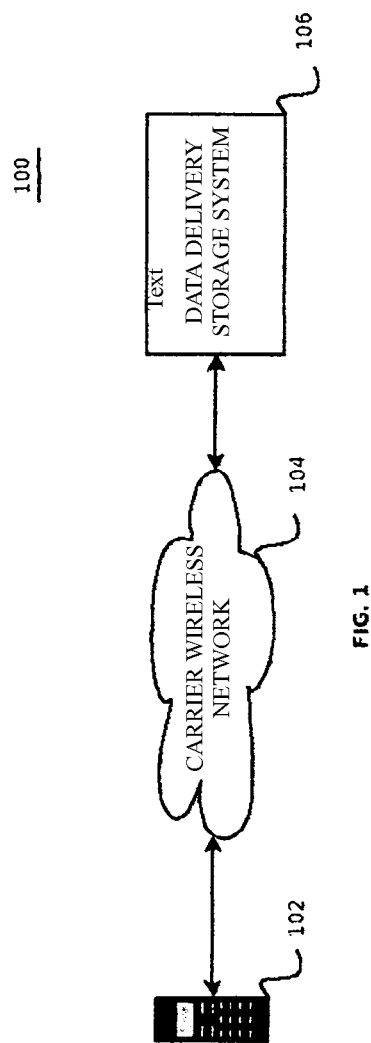
FIG. 1 illustrates a mobile sender controlled data access and data deletion network, in accordance with an embodiment of the present invention.

FIG. 1 is a network 100 depicting a mobile sender controlled data access and data deletion/storage network, in accordance with an embodiment of the present invention. The network 100 includes a user device 102, a carrier wireless network 104, and a message delivery storage system 106. As used in this specification, user device 102 will commonly be a cellular telephone having data communication capabilities, although one skilled in the relevant arts will readily appreciate that any communication device, or device having communication capabilities, can be substituted. Similarly, network 104 will commonly be a carrier wireless network throughout this specification, although one skilled in the relevant arts will likewise appreciate that, depending on the capabilities of user device 102, other network types, to include wired networks of any type, or wireless technology of any type (e.g., Bluetooth, cellular, wi-fi, ad hoc, etc.), can be substituted for wireless network 104.

Data delivery storage system 106 eases the communications between sender and receiver user devices 102, by routing and storing data from sender user device 102 to receiver user device 102, as further disclosed below, in accordance with an embodiment of the present invention. Furthermore, data delivery storage system 106 includes logic for establishing communications with user device 102 over carrier wireless network 104, in accordance with an embodiment of the present invention. Carrier wireless network 104 is, in accordance with an additional embodiment of the present invention, a cellular communications network.

II. Network Communications

Figure 2:
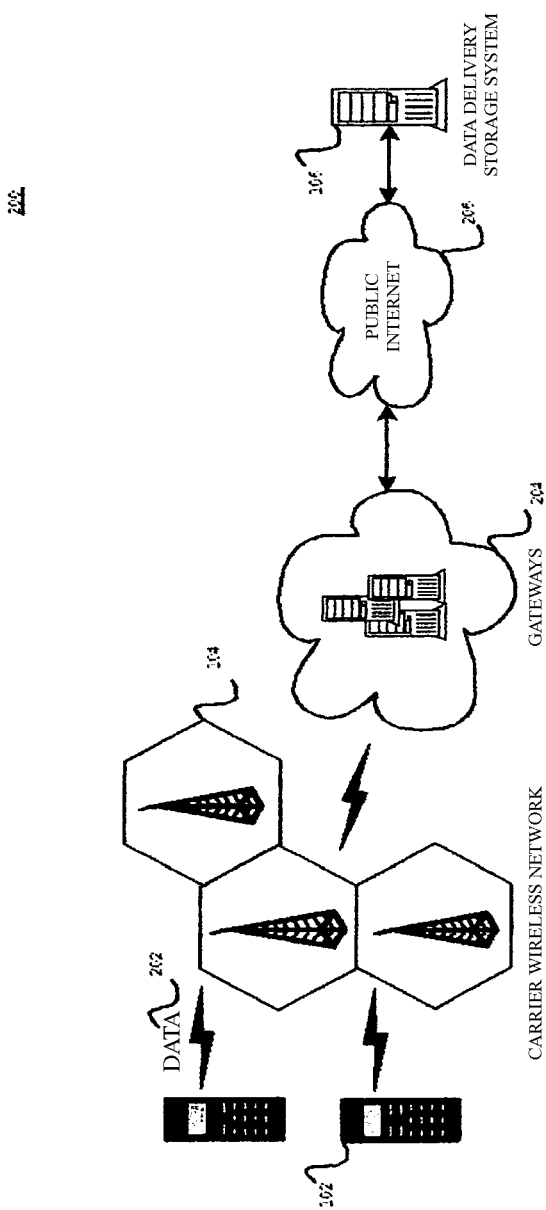
FIG. 2 illustrates communication channels in a mobile sender controlled data access and data deletion network, in accordance with an embodiment of the present invention.

FIG. 2 is a network 200 illustrating communication channels in a mobile sender controlled data access and data deletion network, in accordance with an embodiment of the present invention. As previously disclosed, a user device 102 is operable to connect to a data delivery storage system 106 over carrier wireless network 104 in order to send and receive data. One skilled in the relevant arts will recognize that a user device 102, such as a cellular phone, can communicate using a number of different protocols over a carrier wireless network 104, such as a cellular communications network.

In accordance with an embodiment of the present invention, user device 102 is configured to transmit data of any type over carrier wireless network 104. A carrier gateways 204 are used to receive the data 202 communications from carrier wireless network 104 and forward the communications to data delivery storage system 106, in accordance with an embodiment of the present invention. In accordance with an additional embodiment of the present invention, gateways 204 is a carrier Gateway GPRS Support Node (GGSN) and an SMS gateway Clickatell provided by Clickatell (Pty) Ltd., of Redwood City, Calif. One skilled in the relevant arts will recognize that the precise configuration of the gateways 204 as shown in FIG. 2 need not exist in every system, where instead other means for forwarding the data 202 communications to data delivery system 106 are implemented.

In accordance with an embodiment of the present invention, user device 102 transmits data 202 to gateways 204 through the use of a special "short code" and Internet protocol address assigned to the data delivery storage system 106, in order to allow gateways 204 to properly route the data 202 to the data delivery system 106.

III. Operation of the Data Delivery Storage System

Figure 3:
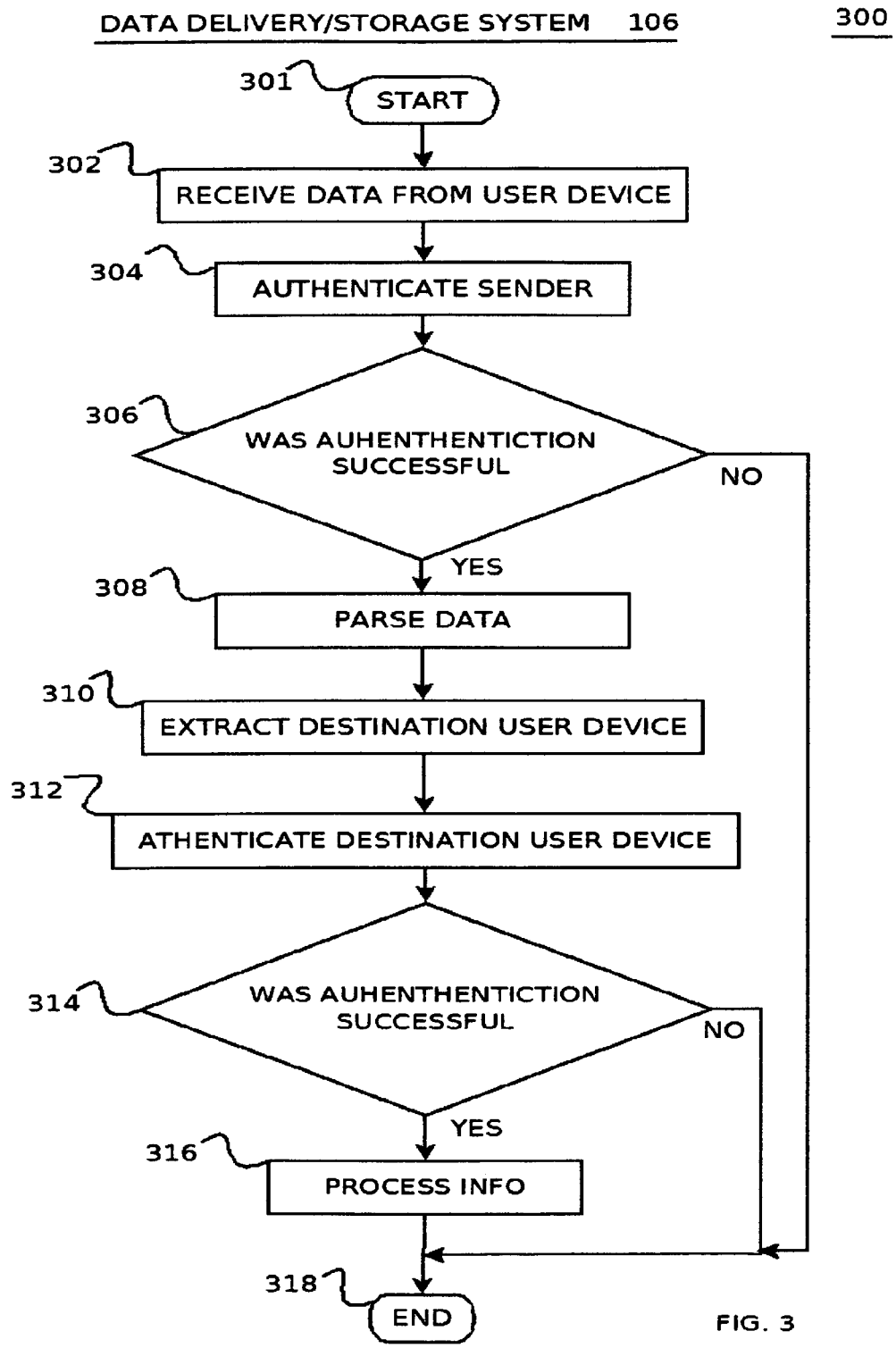
FIG. 3 is a flowchart depicting steps in the operation of a mobile sender controlled data access and data deletion delivery storage system, in accordance with an embodiment of the present invention.

FIG. 3 is a flowchart 300 depicting an operational flow of data delivery storage system 106, in accordance with an embodiment of the present invention. Flowchart 300 method begins at step 301 and proceeds to step 302, where the data delivery storage system 106 receives data 202 from the user device 102. At step 304, the data delivery system 106 performs authentication on the sender user or user device 102, then process proceeds to step 306. If authentication was unsuccessful 306, the method proceeds to step 318 where processing ends. If authentication was successful 306, the method continues to step 308.

At step 308 of flowchart 300, of the data delivery storage system 106, the data 202 is parsed. In the process of parsing the data 202, the intended destination user or user device 102 from some received data 202 is extracted 310. Once extraction 310 is complete, step 312 of the data delivery storage system 106 performs authentication on the destination user or user device 102, then process proceeds to step 314. If authentication was unsuccessful 314, the method proceeds to step 318 where processing ends. If authentication was successful 314, the method continues to step 316.

At step 316 of flowchart 300, the message delivery storage system 106, the parsed data 202 is then repackaged into a data 202 format, and transmitted to the intended destination user or user device 102, as further disclosed below, in accordance with an embodiment of the present invention. The method ends at step 318, in accordance with an embodiment of the present invention.

With continued reference to flowchart 300 of FIG. 3, the data delivery storage system 106, and network 200 of FIG. 2, an example user interaction with the data delivery storage system 106 is disclosed, in accordance with an embodiment of the present invention. A user creates data (image, video, or any file type), at user device 102 to be delivered to a remote user device 102. In this example, the user creates an image. The user then sends this data to the remote user mobile device 102 by entering a mobile number associated with the remote user mobile device 102. In accordance with an embodiment of the present invention, the data is sent to a short code, such as 45772, that uniquely identifies data delivery storage system 106.

At step 302 of flowchart 300, the data delivery system 106 receives the data 202, and at steps 304 and 312 the data delivery system 106 performs any necessary authentication, as will be fully disclosed herein. If authentications are unsuccessful 306 and 314, the process proceeds to step 318. If authentications are successful 306 and 314, the process continues to step 308 and 316, respectively.

At step 308 of flowchart 300, the data delivery system 106 begins parsing the data to identify a token, or tokens in the aforementioned data, which represents the destination user or user device 102 from some received data 202, in accordance with an embodiment of the present invention. Next, this token is extracted 310 and step 312 of the data delivery storage system 106, performs authentication on the destination user or user device 102. If authentication was unsuccessful 314, the method proceeds to step 318 where processing ends. If authentication was successful 314, the method continues to step 316.

Figure 4:
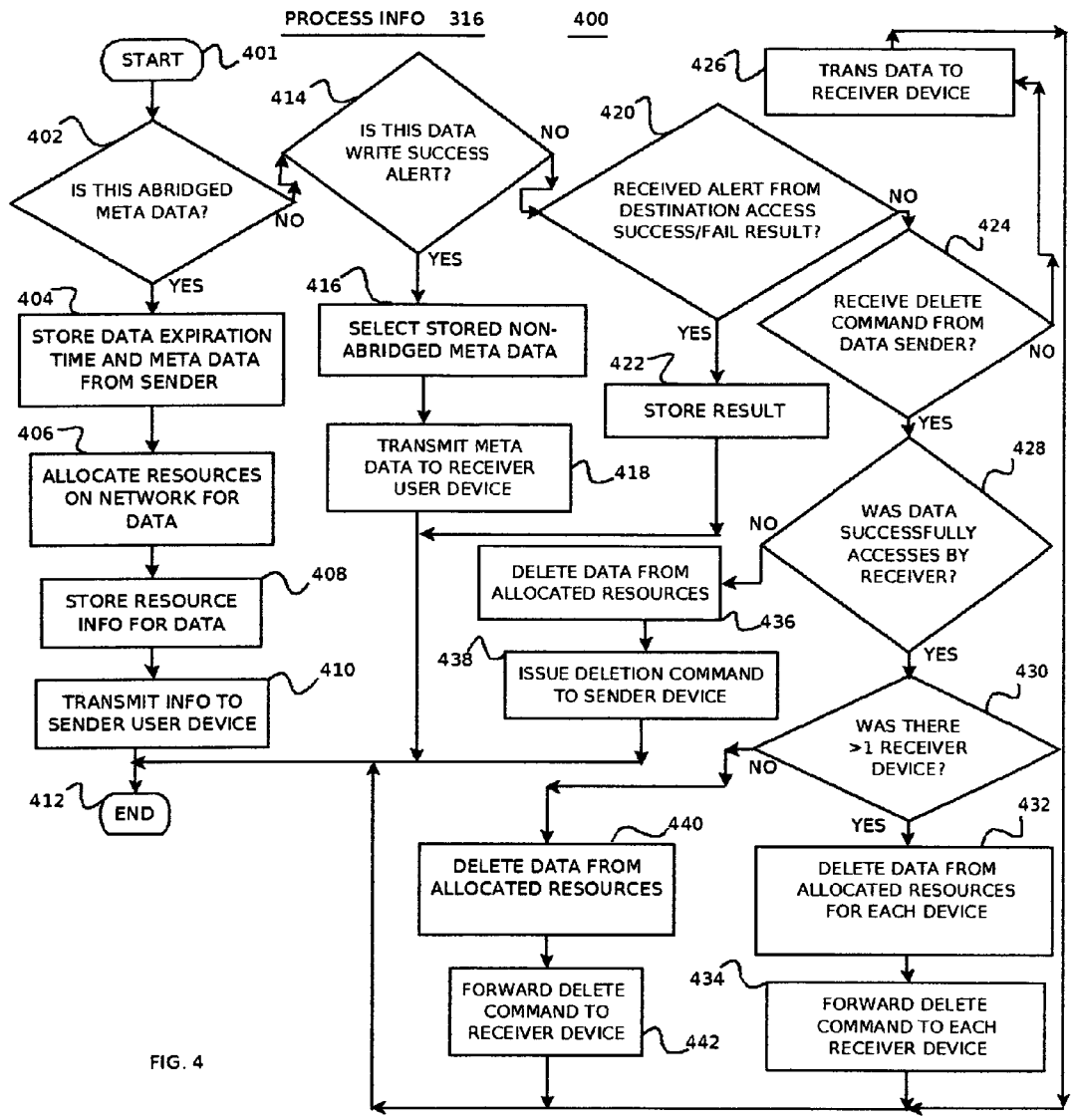
FIG. 4 is a flowchart depicting steps in the operation of the process info process in a mobile sender controlled data access and data deletion delivery storage system, in accordance with an embodiment of the present invention.

At step 316 of flowchart 300, the data delivery system 106, the data is processed, which is described in more detail in FIG. 4, in accordance with an embodiment of the present invention.

In accordance with an additional embodiment of the present invention, if the authentication of steps 306 and 314 fails, the process flow is terminated. In accordance with a further embodiment of the present invention.

IV. Process Information

FIG. 4 is a flowchart 400 depicting a process info flow of the data delivery storage system 106, in accordance with an embodiment of the present invention. The method begins at step 401 and proceeds to step 402, where the data delivery storage system 106 processes data 202 received from the user device 102. At step 402, the data delivery storage system 106 determines if the data is abridged meta data. If data is abridged meta data, then process proceeds to step 404. If data is not abridged meta data, the method proceeds to step 414, which is described in more detail below. Meta data is a set of data that describes and gives information about other data. Abridged meta data is information pertaining to what type of data will be sent and an actual fingerprint or unique marker of the data that will be sent. Non-abridged meta data is the resource or file system information that is linked to the abridged data that includes details such as storage or location information. During the deletion process from the data delivery system, linked meta data, abridged and non-abridged, is automatically removed from the data delivery system. At step 404, the data delivery storage system 106 stores the meta data sent from the sender user device 102. Next, the data delivery storage system 106 allocates network resources for data at step 406. Allocated network resources is the entity which stores the data for example, a hard drive, networked drive, external drive or a cloud system that stores the data. The network resources is a directory of the data. The data delivery storage system 106 then proceeds to step 408. At step 408, the data delivery storage system 106 stores the allocated network resource information. Next, the data delivery system 106 transmits the resource information at step 410 to the sender user device 102. The method then proceeds to step 412 where processing ends.

At step 414, the data delivery storage system 106 determines if the data is a data write success alert. If data is a data write success alert, then process proceeds to step 416. If data is not a data write success alert, the method proceeds to step 420, which is described in more detail below. At step 416, the data delivery storage system 106 selects the stored non-abridged meta data created for the sender user device 102. Next, the data delivery storage system 106 transmits non-abridged meta data to the receiver user device 102 at step 418. The method then proceeds to step 412 where processing ends.

At step 420, the data delivery storage system 106 determines if the data 202 is an alert that the receiver user device 102 was accessed. If data 202 was accessed, then the method proceeds to step 422. If data 202 was not accessed by the receiver user device 102, then the method proceeds to step 424. At step 422, the data delivery storage system 106 stores the result of the receiver user device's 102 access of the locally stored data 202. The method then proceeds to step 412 where processing ends.

At step 424, the data delivery storage system 106 determines if a delete command was sent by the sender user device 102. If a delete command was sent, then the method proceeds to step 428. If delete command was not sent by the sender user device 102, then the method proceeds to step 426.

At step 428, the data delivery storage system 106 determines if the receiver user device 102 successfully accessed the sent data 202. If data 202 was successfully accessed, then the method proceeds to step 430. If data 202 was not successfully accessed, then the method proceeds to step 436.

At step 426, the data delivery storage system 106 transmits data to the receiver user device 102. The method then proceeds to step 412 where processing ends.

At step 436, the data delivery storage system 106 deletes data 202 from the allocated resources. Next, the data delivery storage system 106 issues a deletion command to the sender user device 102, at step 438. The method then proceeds to step 412 where processing ends.

At step 430, the data delivery storage system 106 determines the number of receiver user devices 102 that successfully accessed data 202. If the number of receiver user devices 102 that accessed the data 202 is greater than one, then the method proceeds to step 432. If only one receiver user device 102 accessed the data 202, then the method proceeds to step 440.

At step 440, the data delivery storage system 106 deletes data 202 from the allocated resources. The method then proceeds to step 442.

At step 442, the delete command is forwarded to the receiver user device 102 that accessed the data 202. The method then proceeds to step 412 where processing ends.

At step 432, the data delivery storage system 106 deletes each of the data 202 allocated resources for each receiver. The method then proceeds to step 434 where a delete command is forwarded to each of the receiver user devices 102 that accessed the data 202. The method then proceeds to step 412 where processing ends.

V. Operation of the Authentication Process

Figure 5:
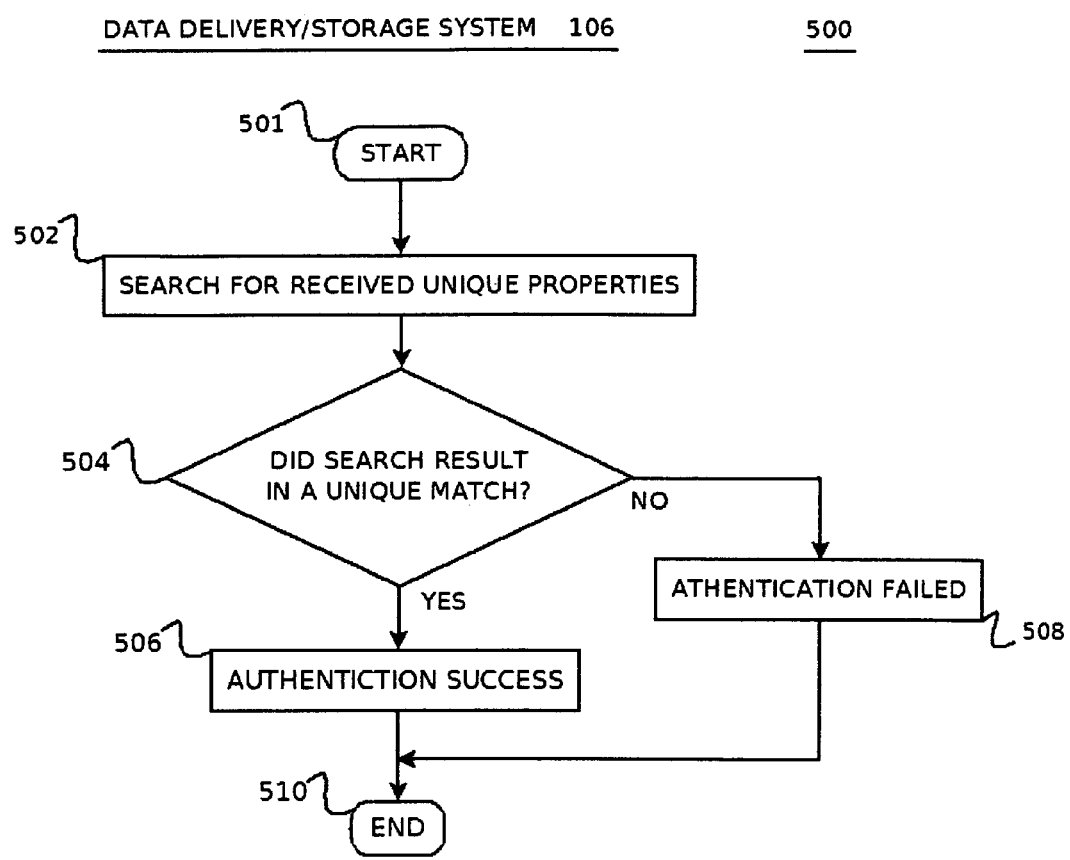
FIG. 5 is a flowchart depicting steps in the operation the authentication process residing in a mobile sender controlled data access and data deletion delivery storage system, in accordance with an embodiment of the present invention.

FIG. 5 is a flowchart 500 depicting an operational flow of the authentication process of the data delivery storage system 106, in accordance with an embodiment of the present invention. The method begins at step 501 and proceeds to step 502, where a search is performed in order to determine if the received unique properties can be found. The result is passed to step 504, in accordance with an embodiment of the present invention. At step 504, it is determined if the result is a valid user, by returning success and proceeding to step 506, if indeed the result is a valid user. Step 504 proceeds to step 508, if the result is determined not to be a valid user, in accordance with an embodiment of the present invention. The process then proceeds to step 510, where it ends.

One skilled in the relevant arts will appreciate that additional means for authentication can be used, and the aforementioned means are described by way of example and not limitation.

VI. User Device Client Service

Figure 6A:
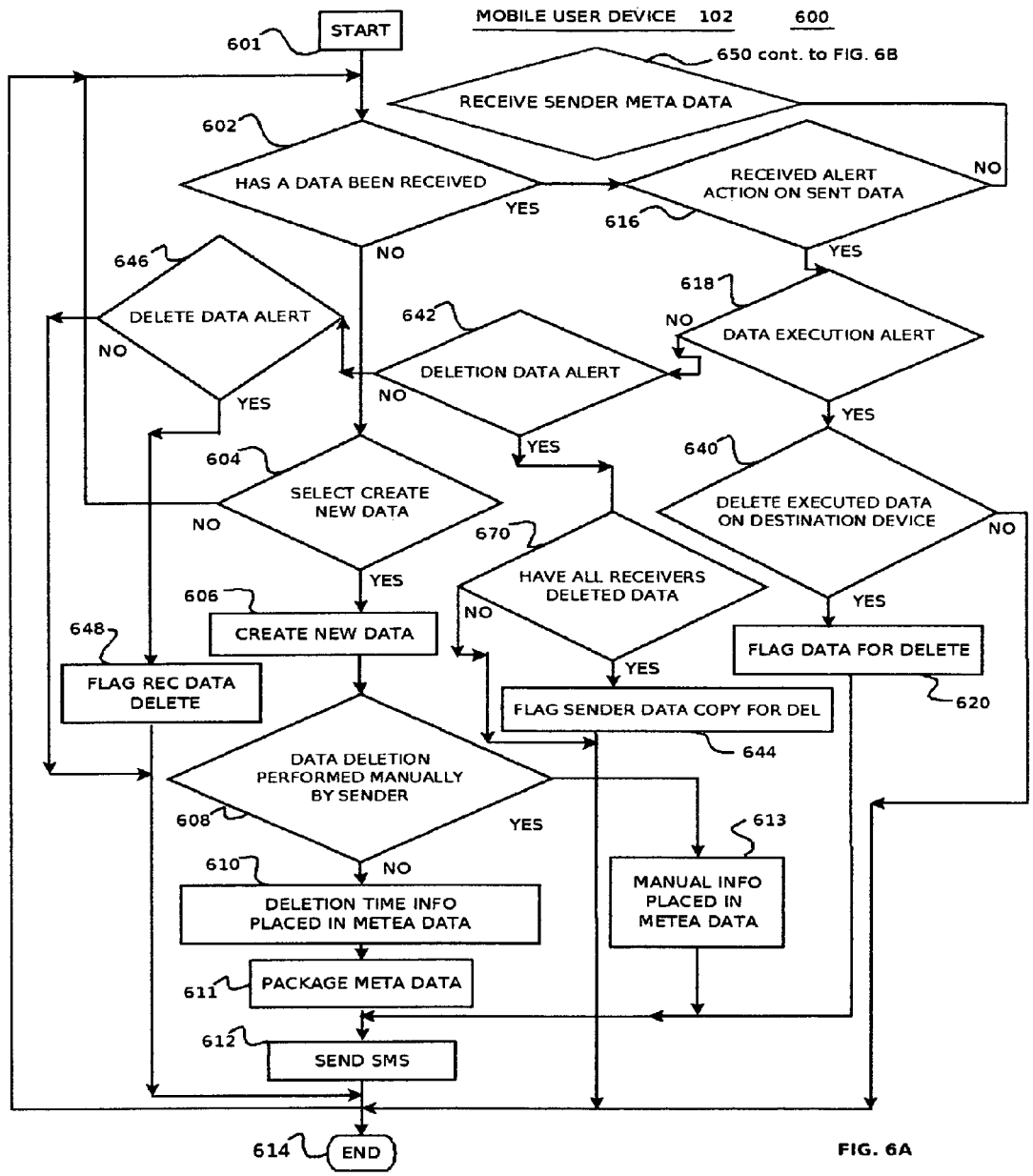
FIG. 6A, FIG. 6B and FIG. 6C combined, is a flowchart depicting steps of a client service for a mobile sender controlled data access and data deletion delivery storage system, in accordance with an embodiment of the present invention.
Figure 6B:
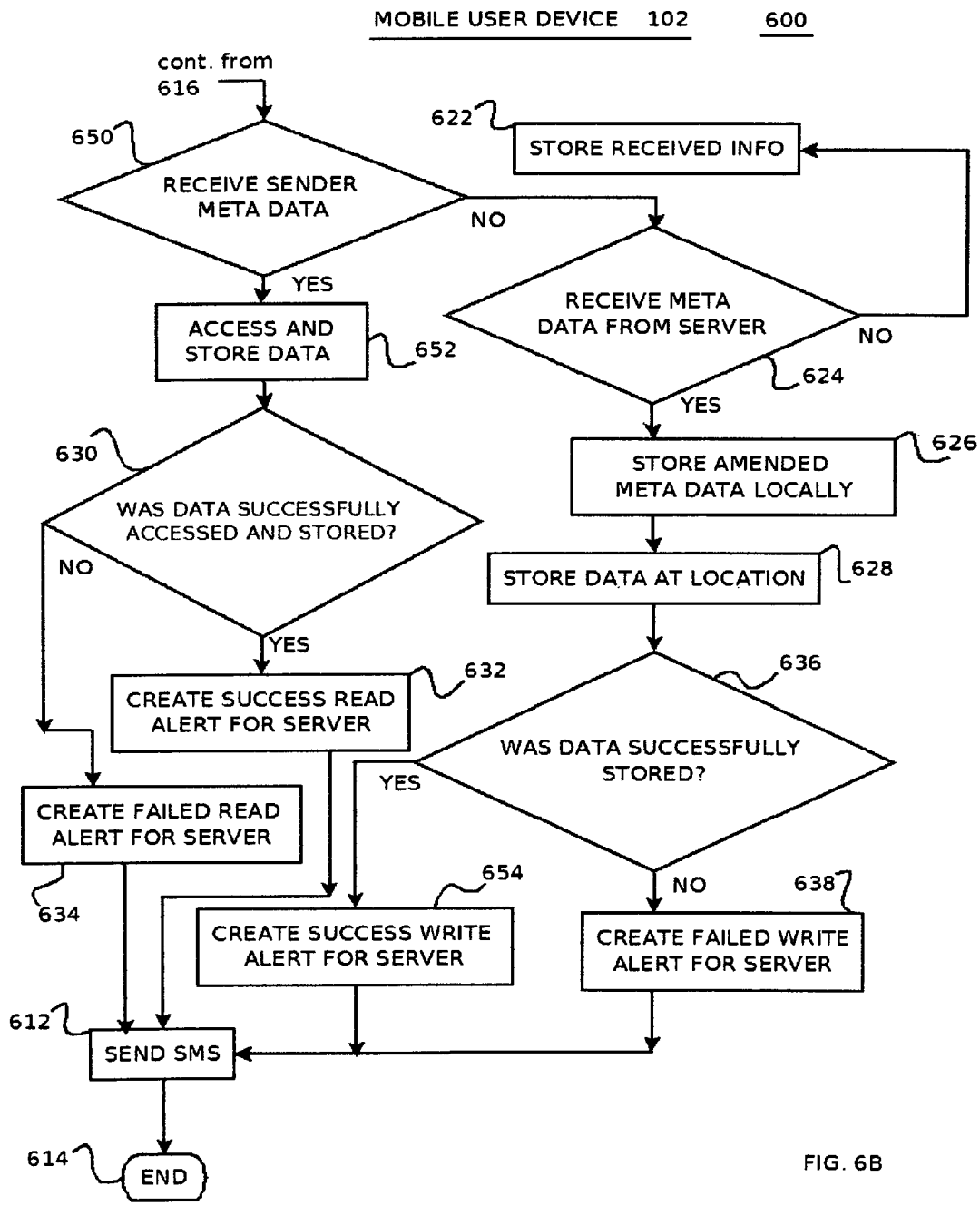
Figure 6C:
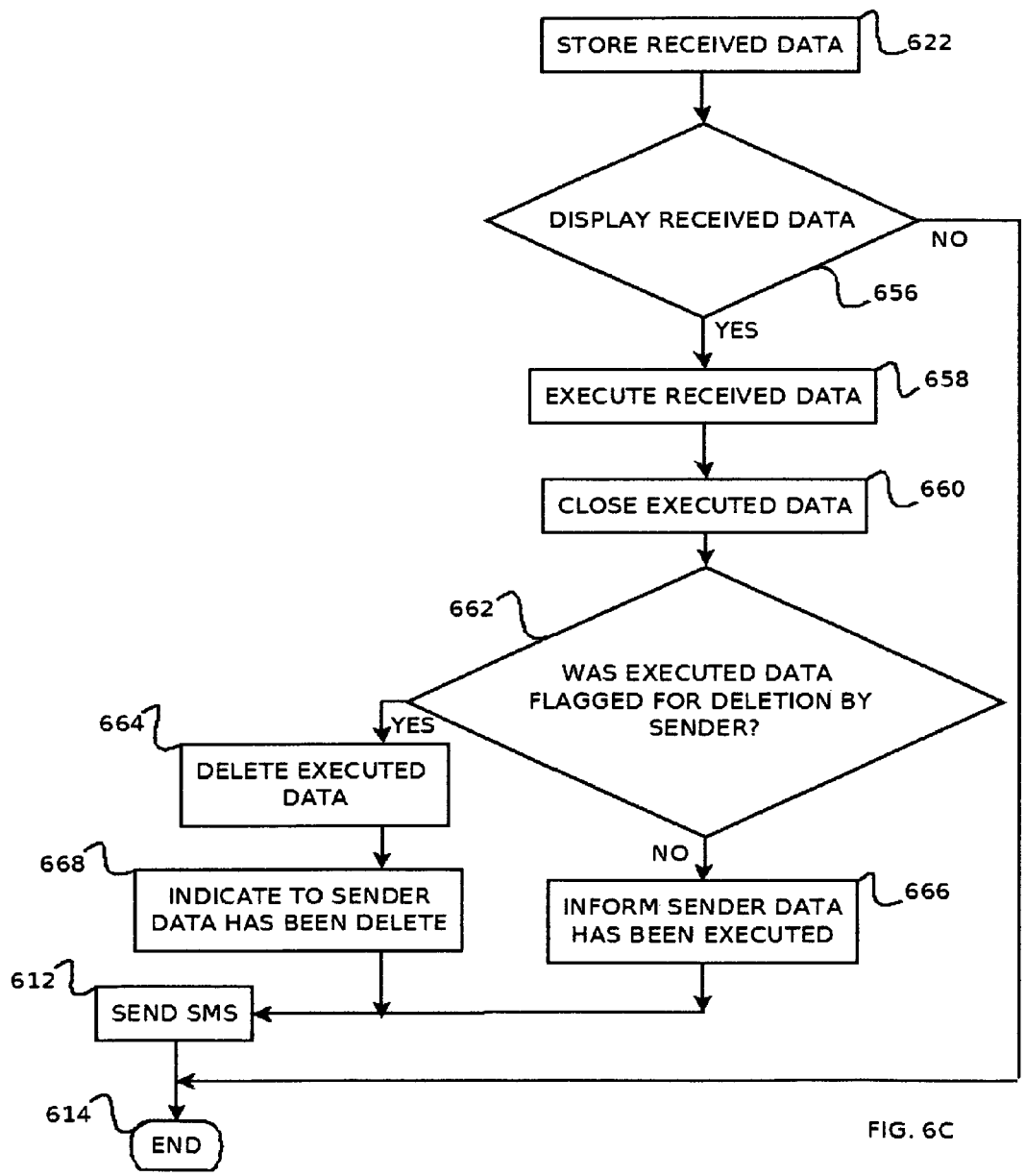

FIG. 6A, FIG. 6B and FIG. 6C combined, is a flowchart 600 depicting an operational flow of client service on the user device 102, in accordance with an embodiment of the present invention, of transmitting and receiving data (image, video, or any file type) 202, where by a sender user device 102 can delete a sent data 202, on a remote receiver user device 102. The method begins in FIG. 6A at step 601 and proceeds to step 602, where the user device 102 receives data 202 sent from a sender user device 102. At step 602, the remote receiver user device 102 performs a check to verify if data 202 was received. If no data 202 was received, the method proceeds to step 604. If data 202 was received, the proceeds to step 616, which is described in more detail below, in accordance with an embodiment of the present invention.

At step 604 of flowchart 600, the client service, on the user device 102, verifies if create new data option is selected, in accordance with an embodiment of the present invention. If it was not selected, step 604 continues to step 602. If it was selected, the method proceeds to step 606. At step 606, new data is created, in accordance with an embodiment of the present invention. Once the data is created, the method continues to step 608.

At step 608 of flowchart 600, the client service, on the user device 102, verifies if a manual delete is to be performed on the data 202 when it arrives on the remote user device 102, or on allocated resource within the data delivery storage system 106, in accordance with an embodiment of the present invention. If no manual delete is to be performed, the method continues to step 610 where data time of existence is set, then the method continues to step 611, which packages the meta data, in accordance with an embodiment of the present invention. Once the meta data is created, the method continues to step 612. If manual delete is to be performed, the method continues to step 613 where data time of existence is set to manual. The method then continues to step 612.

At step 612 of flowchart 600, the client service, on the user device 102, and transmits data 202 to the carrier wireless network 104, in accordance with an embodiment of the present invention. The process then proceeds to step 614, where it ends.

At step 616 of flowchart 600, the client service, on the user device 102, verifies if the received data 202 is an alert that a remote receiver user device 102 has performed an action on a previously sent data 202, in accordance with an embodiment of the present invention. If the received data 202 is an action alert, the process then proceeds to step 618, which is described in more detail below. If the received data 202 is not an alert, the process then proceeds to step 650, which is illustrated and described in more detail in FIG. 6B.

At step 618 of flowchart 600, the client service, on user device 102, extract the execution flag and unique identifier from the alert of the received data 202. One skilled in the relevant arts will recognize that step 618 can be accomplished by various methods within user device 102, in accordance with an embodiment of the present invention. If the flag is determined not to be a set access flag, the process proceeds to step 642, which is described in more detail below. If the flag is determined to be a set open flag, the process proceeds to step 640.

At step 640 of flowchart 600, the client service, on the user device 102, verifies the unique identifier of the manual time of existence data 202 to be deleted on the remote receiver user device 102, in accordance with an embodiment of the present invention. If, the uniquely identified manual time of existence data 202 is to be deleted on the remote receiver user device, the process proceeds to step 620, which is described in more detail below. If, the uniquely identified manual time of existence data 202 is to be not deleted on the remote receiver user device, the process proceeds to step 614 where processing ends.

At step 620 of flowchart 600, the client service, on the user device 102, sets the delete flag, the unique identifier and an non restrictive time of existence, in accordance with an embodiment of the present invention, and is forwarded to step 612. One skilled in the relevant arts will recognize that step 620 can be accomplished by various methods within user device 102, in accordance with an embodiment of the present invention.

At step 642 of flowchart 600, the client service, on the user device 102, extracts the deletion complete flag and unique identifier from the alert of the received data 202. One skilled in the relevant arts will recognize that step 642 can be accomplished by various methods within user device 102, in accordance with an embodiment of the present invention. If the flag is determined to be a set deletion complete flag, the process proceeds to step 670, which is described in more detail below. If the flag is determined not to be a set deletion complete flag, the process proceeds to step 646.

At step 670 of flowchart 600, the client service, on the user device 102, determines if all of the receiver devices 202 have deleted their data. One skilled in the relevant arts will recognize that step 670 can be accomplished by various methods within user device 102, in accordance with an embodiment of the present invention. If all of the receiver devices 202 have deleted their data, the process proceeds to step 644, which is described in more detail below. If all of the receiver devices 202 have not deleted their data, the process proceeds to step 614.

At step 646 of flowchart 600, the client service, on the user device 102, extracts the delete flag and unique identifier from the alert of the received data 202. One skilled in the relevant arts will recognize that step 646 can be accomplished by various methods within user device 102, in accordance with an embodiment of the present invention. If the flag is determined to be a set delete flag, the process proceeds to step 648, which is described in more detail below. If the flag is determined not to be a set delete flag, the process proceeds to step 614 where processing ends.

At step 644 of flowchart 600, the client service, on the user device 102, utilizes the unique identifier from the alert of the data 202, and flags the sender's copy of the manual time of existence data 202 for deletion. One skilled in the relevant arts will recognize that step 644 can be accomplished by various methods within user device 102, in accordance with an embodiment of the present invention. Deletion of sender's copy of the manual time of existence data 202, may be performed at any time, of the sender's own choosing. The process proceeds to step 614 where processing ends.

At step 648 of flowchart 600, the client service, on the user device 102, utilizes the unique identifier from the alert of the data 202, and sets a delete flag of the uniquely identified manual time of existence data 202, on the receiver user device 102. One skilled in the relevant arts will recognize that step 648 can be accomplished by various methods within user device 102, in accordance with an embodiment of the present invention. The process proceeds to step 614 where processing ends.

The method continues in FIG. 6B at step 650 of flowchart 600 from step 616, the client service on the user device 102, signals that a data 202 is meta data sent from the sender user device 102, as previously illustrated in FIG. 6A. The process then proceeds to step 652. If data 202 is not meta data, then the process proceeds to 624, as described in more detail below.

At step 652 of flowchart 600, the client service, on the user device 102, the data 202 is accessed and locally stored on the receiver user device. One skilled in the relevant arts will recognize that step 652 can be accomplished by various methods within user device 102, in accordance with an embodiment of the present invention. The process then proceeds to step 630.

At step 630 of flowchart 600, the client service, on the user device 102, determines if the data 202 was successfully accessed and stored locally. One skilled in the relevant arts will recognize that step 630 can be accomplished by various methods within user device 102, in accordance with an embodiment of the present invention. If the data 202 is successfully accessed and stored, the process proceeds to step 632, which is described in more detail below. If the data 202 is not successfully accessed and stored, the process proceeds to step 634.

At step 632 of flowchart 600, the client service, on the user device 102, creates a successful read alert, then the process proceeds to step 612, which is described in more detail above.

At step 634 of flowchart 600, the client service, on the user device 102, creates an unsuccessful read alert, then the process proceeds to step 612, which is described in more detail above.

At step 624 of flowchart 600, the client service, on the user device 102, determines if the data 202 is amended meta data sent from the data delivery storage system 106. If the data 202 is meta data sent from the data delivery storage system 106, the process proceeds to step 626, which is described in more detail below. If the data 202 is not amended meta data sent from the data delivery system 106, the process proceeds to step 622.

At step 622 of flowchart 600, the client service, on the user device 102, signals that the information has been received and gets stored.

At step 626 of flowchart 600, the client service, on the user device 102, stores the amended meta data 202, then the process proceeds to step 628.

At step 628 of flowchart 600, the client service, on user device 102, accesses allocated resources on the data delivery storage system 106 and stores data 202 (image, video, or any file type). One skilled in the relevant arts will recognize that step 628 can be accomplished by various methods within user device 102, in accordance with an embodiment of the present invention. The process proceeds to step 636.

At step 636 of flowchart 600, the client service, on the user device 102, determines if the data 202 (image, video, or any file type) was successfully accessed and stored locally. One skilled in the relevant arts will recognize that step 636 can be accomplished by various methods within user device 102, in accordance with an embodiment of the present invention. If the data 202 is successfully written, the process proceeds to step 654, which is described in more detail below. If the data 202 is not successfully written, the process proceeds to step 638.

At step 638 of flowchart 600, the client service, on the user device 102, creates a failed write alert, then the process proceeds to step 612, which is described in more detail above.

At step 654 of flowchart 600, the client service, on the user device 102, creates an successful write alert, then the process proceeds to step 612, which is described in more detail above.

The method continues in FIG. 6C at step 622 of flowchart 600, the client service, on the user device 102, signals that data 202 has been received and stores the received data 202, as previously illustrated in FIG. 6B. The process then proceeds to step 656.

At step 656 of flowchart 600, the client service, on the user device 102, may execute the received manual time of existence data 202 (image, video, or any file type). If the user device 102 will not execute the received manual time of existence data 202, the process proceeds to step 614 where processing ends, as previously illustrated in FIG. 6A and FIG. 6B. If the user device 102 will execute the received manual time of existence data 202, the process proceeds to step 658.

At step 658 of flowchart 600, the client service, on the user device 102, executes the received manual time of existence data 202, thereby run the binary content and flags the manual time of existence data 202 as executed data. One skilled in the relevant arts will recognize that step 658 can be accomplished by various methods within user device 102, in accordance with an embodiment of the present invention. The process then proceeds to step 660.

At step 660 of flowchart 600, the client service, on the user device 102, closes the execution of manual time of existence data 202, then proceeds to step 662, in accordance with an embodiment of the present invention.

At step 662 of flowchart 600, the client service, on the user device 102, verifies if the executed manual time of existence data 202 delete flag was set by the sender user device 102, in accordance with an embodiment of the present invention. If executed manual time of existence data 202 delete flag was set, the process proceeds to step 664, which is described in more detail below. If the executed manual time of existence data 202 delete flag was not set, the process proceeds to step 666.

At step 666 of flowchart 600, the client service on the user device 102 sets a executed flag, a unique identifier and an non restrictive time of existence, for the executed manual time of existence data 202, in accordance with an embodiment of the present invention, is forwarded to step 612, which is illustrated above in FIG. 6A and FIG. 6B.

At step 664 of flowchart 600, the client service, on the user device 102, deletes the executed manual time of existence data 202 (image, video, or any file type) from the user device 102 storage. One skilled in the relevant arts will recognize that step 664 can be accomplished by various methods within user device 102, in accordance with an embodiment of the present invention. The process then proceeds to step 668.

At step 668 of flowchart 600, the client service, on the user device 102, sets a deletion complete flag, a unique identifier and an non restrictive time of existence, for the executed manual time of existence data 202, in accordance with an embodiment of the present invention, is forwarded to step 612, which is illustrated above in FIG. 6A and FIG. 6B.

VII. User Device Client Service Automatic Time of Existence Data Flagging

Figure 7:
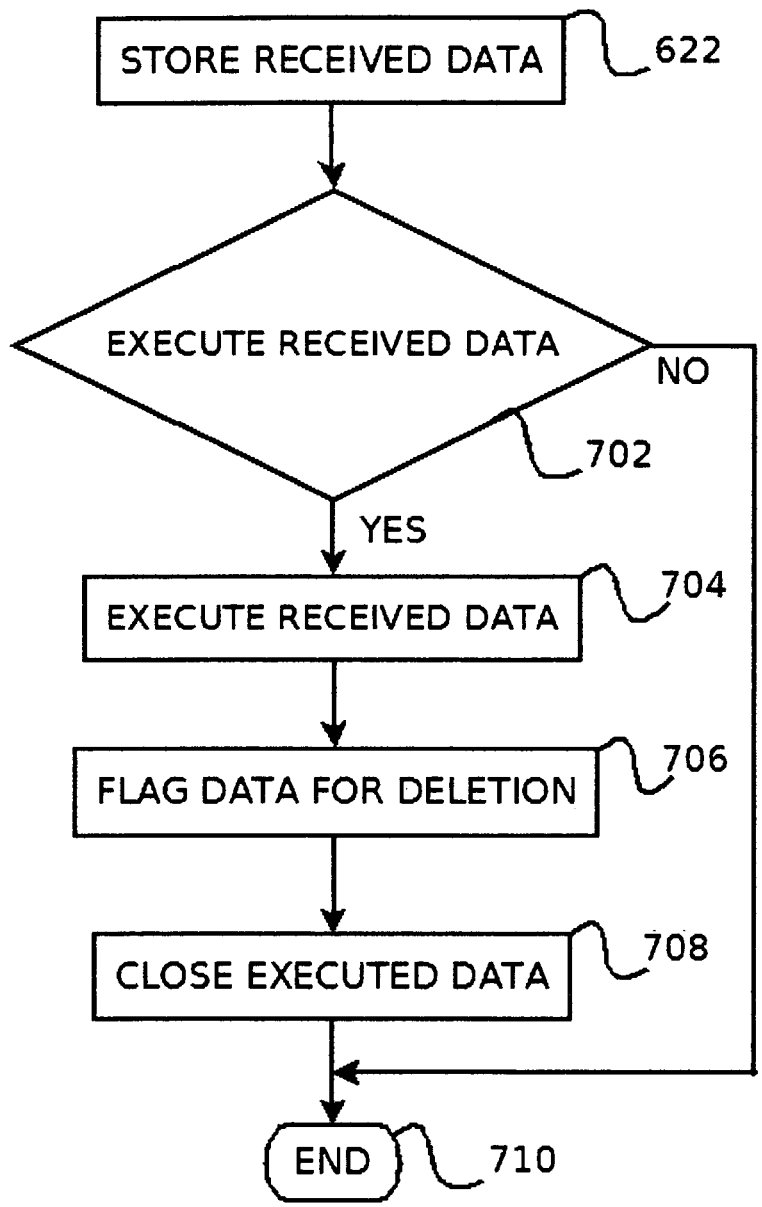
FIG. 7 is a flowchart depicting steps of the flagging process of data, of type relative execution time for automatic time of existence, in a client service for a mobile sender controlled data access and data deletion delivery storage system, in accordance with an embodiment of the present invention.

FIG. 7 is a flowchart 700 depicting an operational flow of flagging process of automatic time of existence data, of type relative execution time, of the client service on the user device 102, in accordance with an embodiment of the present invention, for the handling of received data 202 (image, video, or any file type) that have an automatic time of existence of type relative execution time, meaning sender user device 102 has preset the time of existence. As previously illustrated in FIG. 6A, FIG. 6B and FIG. 6C, operational flow of the client service on the user device 102, step 622 signals that a data 202 has been received and stores the received data 202. One skilled in the relevant arts will recognize that step 622 can be accomplished by various methods within user device 102, in accordance with an embodiment of the present invention. The process then proceeds to step 702.

At step 702 of flowchart 700, the flagging process of automatic time of existence data, of type relative execution time, of the client service on the user device 102, may execute the received data 202, which takes the process to step 704, which is described in more detail below, in accordance with an embodiment of the present invention. If the user device 102 will not execute the received data 202, the process proceeds to step 710 where processing ends.

At step 704 of flowchart 700, the flagging process of automatic time of existence data, of type relative execution time, of the client service on the user device 102, executes the stored automatic time of existence data 202, of type relative execution time, and performs its task. The process then proceeds to step 706. In accordance with an additional embodiment of the present invention, received data 202 with automatic time of existence is discussed.

At step 706 of flowchart 700, the flagging process of automatic time of existence data, of type relative execution time, of the client service on the user device 102, flags the automatic time of existence data 202 as executed, then stores the data 202. One skilled in the relevant arts will recognize that step 706 can be accomplished by various methods within user device 102, in accordance with an embodiment of the present invention. The process then proceeds to step 708.

At step 708 of flowchart 700, the flagging process of automatic time of existence data, of type relative execution time, of the client service on the user device 102, closes executed data 202, then proceeds to the end at step 710, in accordance with an embodiment of the present invention.

VIII. User Device Client Service Deletion Background Process

Figure 8:
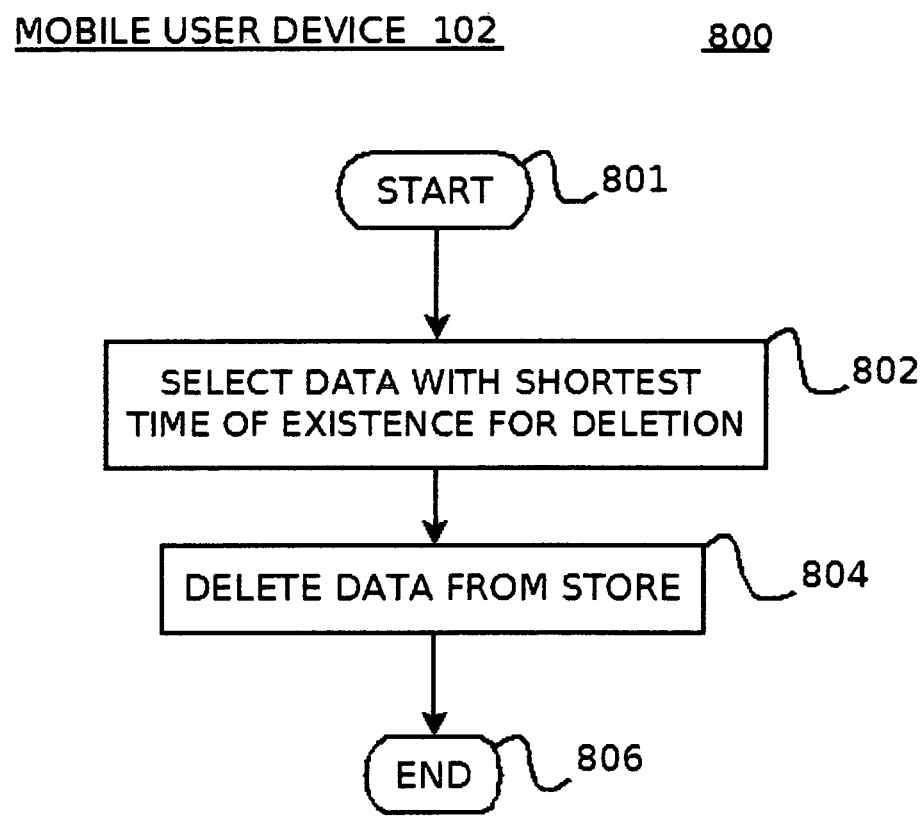
FIG. 8 is a flowchart depicting steps of the deletion background process of a client service for a mobile sender controlled data access and data deletion delivery system, in accordance with an embodiment of the present invention.

FIG. 8 is a flowchart 800 depicting an operational flow of the deletion background process, of a client service on the user device 102, in accordance with an embodiment of the present invention, of expired automatic time of existence and delete flagged manual time of existence data 202. The method begins at step 801 and proceeds to step 802, where the process 802 selects data from the user device's 102 store, that is the smallest expired automatic time of existence of type relative execution time, smallest manual time of existence that has been flagged as delete, or expired automatic time of existence of type relative arrival time. One skilled in the relevant arts will recognize that step 802 can be accomplished by various methods within user device 102, in accordance with an embodiment of the present invention. The process then proceeds to step 804.

At step 804 of flowchart 800, the deletion background process, of a client service on the user device 102, deletes the selected data from the user device 102. One skilled in the relevant arts will recognize that step 804 can be accomplished by various methods within user device 102, in accordance with an embodiment of the present invention. The process then proceeds to step 806, where the process ends.

IX. Advantages

From the description above, a number of advantages of some embodiments of my sender controlled data access and deletion method become evident:

(a) The data sender of the data can maintain control over the complete life cycle of sent data, even after it has been accessed by the intended receiver.

(b) The receiver of the data no longer has equal control over the accessed data, as the sender. The sender has superior, and sometimes sole control over the sent data.

(c) The sender can send data other than text messages, such as pictures, video, etc. Data files of various types may be sent.

(d) The sender has knowledge that data was deleted.

(e) The sender device is the creator and owner of the data, as such, the sender dictates the duration of the data's existence. Not some other entity.

(f) The sender device may delete the same data delivered to multiple receiver devices.

X. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

I claim:

1. A method of remotely deleting previously transmitted data from one or more remote devices comprising the steps of:

a. a sender device creating data;

b. a sender sending the data from the sender device, wherein the created data has an unique identifier, wherein the unique identifier is a tag for subsequent location and deletion of the created data;

c. the sender authenticating a destination user or user device, wherein a search is performed to determine one or more properties associated with a valid user;

d. receiving the created data on one or more remote devices, wherein the created data is stored on the one or more remote devices;

e. the one or more remote devices verifying the receipt of the created data, wherein the unique identifier of the created data is verified by the sender device;
f. creating a delete command, wherein the delete command is preloaded with the unique identifier and preloaded with a preset time for deletion of the stored data;
g. sending the delete command over a wireless network to the one or more remote devices, wherein the delete command is sent at the sender's discretion, wherein the delete command instructs the one or more remote devices to delete the stored data, wherein the delete command is directed to and received by the one or more remote devices having received the created data, wherein the one or more remote devices identify the stored data to be deleted by the unique identifier, and wherein the stored data is permanently deleted from the one or more remote devices upon receipt of the delete command, and wherein the delete command is selected from a group consisting of manual delete, automatic relative execution time, and automatic relative arrival time; and
h. presetting the time for deletion of the stored data, wherein the time is preset, wherein the preset time is incorporated into the delete command, wherein the time is preset as the automatic relative execution time or the automatic relative arrival time, wherein the step of the sender sending the data further comprising the steps of:
  i. facilitating transmission of the data by a data delivery storage over the wireless network from the sender device to the one or more remote devices, wherein the data delivery storage is in communication with the sender device and the one or more remote devices;
  ii. parsing the created data by the data delivery storage, wherein the one or more remote devices is identified by a token within the parsed data, wherein the created data is repackaged;
  iii. routing the created data by the data delivery storage between the sender device and the one or more remote devices.

2. The method according to claim 1, wherein the step of receiving the data further comprises: authenticating the sender device by comparing a unique properties of the sender device to registered values for the unique properties.

3. The method according to claim 2, wherein the sender device is a phone, and further wherein the unique properties comprise of a phone number and unique phone attributes.

4. The method according to claim 1, further comprising the step of: comparing the unique properties of the remote user device to registered values for the unique properties.

5. The method according to claim 4, wherein the one or more remote devices is a phone, and further wherein the unique properties comprise at least a phone number.

6. The method according to claim 1, further comprising the step of receiving a data executed alert to the sender device.

7. The method according to claim 1, wherein the step of sending the delete command, further comprises the steps of:
  a. a data delivery storage determining a number of the one or more remote devices that accessed the created data;
  b. forwarding the delete command to all of the one or more remote devices that accessed the created data, and wherein the delete command is forwarded based on the location of the unique identifier within the stored data.

8. The method according to claim 1, further comprising the step of receiving a deletion complete alert on the sender device, wherein the deletion complete alert is sent over the wireless network from the one or more remote devices, wherein the delete complete alert is sent after the stored data has been deleted.

* * * * *